(12) United States Patent
Blanchard et al.

(10) Patent No.: US 11,285,770 B2
(45) Date of Patent: Mar. 29, 2022

(54) SUSPENSION THRUST BEARING DEVICE AND SUSPENSION STRUT EQUIPED WITH SUCH A DEVICE

(71) Applicant: Aktiebolaget SKF, Gothenburg (SE)

(72) Inventors: Xavier Blanchard, Saint-Cyr-sur-Loire (FR); Thomas Lepine, Tours (FR); Bruno Montboeuf, Saint-Cyr-sur-Loire (FR); Desire Vidot, Ballan-Miré (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/738,924

(22) Filed: Jan. 9, 2020

(65) Prior Publication Data
US 2020/0231015 A1    Jul. 23, 2020

(30) Foreign Application Priority Data
Jan. 21, 2019   (DE) .......................... 102019200695.7

(51) Int. Cl.
*B60G 15/04*       (2006.01)
*F16C 19/12*       (2006.01)

(52) U.S. Cl.
CPC .............. *B60G 15/04* (2013.01); *F16C 19/12* (2013.01); *B60G 2204/41* (2013.01); *B60G 2204/418* (2013.01); *F16C 2326/05* (2013.01)

(58) Field of Classification Search
CPC .. B60G 15/04; B60G 15/068; B60G 2204/41; F16C 19/12; F16C 2326/05
See application file for complete search history.

(56) References Cited

U.S. PATENT DOCUMENTS

| | | | | |
|---|---|---|---|---|
| 4,810,003 A | * | 3/1989 | Pinch | B60G 13/006 280/124.155 |
| 5,248,134 A | * | 9/1993 | Ferguson | B60G 15/068 188/321.11 |
| 2002/0003913 A1 | * | 1/2002 | Beghini | F16C 35/04 384/609 |
| 2002/0009249 A1 | * | 1/2002 | Beghnini | F16C 33/761 384/607 |
| 2002/0113353 A1 | * | 8/2002 | Erhardt | B60G 15/07 267/179 |
| 2008/0031562 A1 | | 2/2008 | Poulle et al. | |
| 2010/0014792 A1 | | 1/2010 | Kellam | |

(Continued)

FOREIGN PATENT DOCUMENTS

| | | | | |
|---|---|---|---|---|
| DE | 4340556 A1 | * | 6/1995 | ................ F16F 9/54 |
| DE | 102010025372 A1 | * | 12/2011 | ........... B60G 15/068 |

(Continued)

*Primary Examiner* — Paul N Dickson
*Assistant Examiner* — Kurtis Nielson
(74) *Attorney, Agent, or Firm* — Garcia-Zamor Intellectual Property Law; Ruy Garcia-Zamor; Bryan Peckjian

(57) ABSTRACT

A suspension thrust bearing device for use with a suspension spring in an automotive suspension strut of a vehicle. The device includes a bearing having an upper annular bearing member and a lower annular bearing member in relative rotation, and a damping element made of resilient material and interposed between the lower annular bearing member and the suspension spring. The lower annular bearing member provides an outwardly radially-extending flange, the flange being embedded within the damping element.

19 Claims, 2 Drawing Sheets

(56) References Cited

U.S. PATENT DOCUMENTS

| | | | | |
|---|---|---|---|---|
| 2011/0274384 A1* | 11/2011 | Montboeurf | ........ | F16C 33/3856 384/607 |
| 2011/0291337 A1* | 12/2011 | Viault | .................. | B60G 15/068 267/220 |
| 2012/0257849 A1* | 10/2012 | Corbett | .................... | F16C 33/60 384/607 |
| 2012/0280441 A1* | 11/2012 | Inoue | .................. | B60G 13/003 267/220 |
| 2013/0277161 A1* | 10/2013 | Bussit | .................. | B60G 15/068 188/321.11 |
| 2016/0223023 A1* | 8/2016 | Lee | ........................ | F16C 19/163 |
| 2017/0261032 A1* | 9/2017 | Lepine | .................... | F16C 19/12 |
| 2018/0372152 A1* | 12/2018 | Gaultier | .................. | F16C 19/10 |
| 2019/0331192 A1* | 10/2019 | Gorski | ........................ | F16F 9/38 |
| 2020/0164708 A1* | 5/2020 | Lim | ..................... | B60G 15/068 |
| 2020/0189344 A1* | 6/2020 | De Lemps | .............. | B60G 15/02 |
| 2020/0238779 A1* | 7/2020 | Blanchard | ............... | F16F 1/126 |
| 2020/0378438 A1* | 12/2020 | Morita | .................... | F16C 33/78 |

FOREIGN PATENT DOCUMENTS

| | | | | |
|---|---|---|---|---|
| DE | 102017108477 B3 * | 6/2018 | .......... | B60G 15/067 |
| EP | 215231 B1 | 2/1990 | | |
| FR | 2825324 A1 * | 12/2002 | ........... | B60G 15/068 |
| KR | 20160049694 A * | 5/2016 | | |
| KR | 20180068573 A * | 6/2018 | | |
| WO | 2008152241 A2 | 12/2008 | | |

* cited by examiner

SUSPENSION THRUST BEARING DEVICE AND SUSPENSION STRUT EQUIPED WITH SUCH A DEVICE

CROSS-REFERENCE TO RELATED APPLICATIONS

This application claims priority to German patent application no. 102019200695.7, filed on Jan. 21, 2019, the contents of which IS fully incorporated herein by reference.

TECHNICAL FIELD OF THE INVENTION

The present invention relates to a suspension thrust bearing device, in particular of the MacPherson type ("MacPherson Suspension Bearing Unit" or MSBU). The invention also relates to a strut for a motor vehicle, having a damper and such a suspension thrust bearing device. The field of the invention is that of suspension systems, notably motor-vehicle suspension systems.

BACKGROUND OF THE INVENTION

In a known manner, a motor vehicle suspension system comprises a suspension strut supporting an axle and a vehicle wheel. A suspension thrust bearing device is disposed in an upper portion of the suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members in relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved using a damping element made of resilient material and mounted between the lower annular bearing member and the suspension spring. In a known manner, the damping element is overmolded onto the lower member.

Such a suspension thrust bearing device, notably of the MSBU type, is required to be used in an aggressive environment. The vehicle is for example likely to run on a flooded, dusty or muddy road and then be cleaned with a high-pressure cater jet. In these conditions, ingress of water or of other polluting particles may occur in the strut, notably in the bearing, with harmful consequences to their service life and their respective performances.

In this respect, it is known from document US 2008/0031562 A1 to provide a deflecting flange extending substantially radially from a damping element, the flange being designed to form a flow deflector for reducing any ingress of water and other pollutants inside the suspension thrust bearing device.

However, the axial load of suspension spring onto the damping element may induce axial and radial deformations of the element. More particularly, it has been observed that the deflecting flange upwardly move towards the upper cup. This undesired flange displacement leads to contacts with the upper cup, and then an increase of suspension thrust bearing device torque and negative impact on device performances. The deflecting flange and the upper cup may be worn and have a reduced service life. It also leads to an extra noise which must be prohibited.

Moreover, this undesired damping element displacement leads to separation of damping element from the lower bearing element. The consequences are negative impact on damping performances.

SUMMARY OF THE INVENTION

The aim of the invention is to overcome these drawbacks by proposing an enhanced suspension thrust bearing device. It is desirable to provide a suspension thrust bearing device which is relatively inexpensive, has a good operational reliability, and has an increased service life.

To this end, the invention relates to a suspension thrust bearing device, for use with a suspension spring in an automotive suspension strut of a vehicle. The suspension thrust bearing device comprises a bearing having upper and lower annular bearing members in relative rotation.

The suspension thrust bearing device further comprises a damping element made of resilient material and interposed between the lower annular bearing member and the suspension spring.

According to the invention, the lower annular bearing member comprises an outwardly radially-extending flange, the flange being embedded within the damping element.

According to further aspects of the invention which are advantageous but not compulsory, such a suspension thrust bearing device may incorporate one or several of the following features:

The suspension thrust bearing device comprises a bearing with a first ring fixed to an upper cap, so as to form the upper annular bearing member of the suspension thrust bearing, and a second ring fixed to a lower cap, so as to form the lower annular bearing member of the suspension thrust bearing.

The first and second rings are made from a stamped metal sheet.

The upper and lower caps are made from a rigid plastic material.

The lower cap is provided with an embedded stiffening insert.

The upper cap is provided with an embedded stiffening insert.

The lower cap comprises a radial body, the flange radially outwardly extending from outer side of the radial body.

The lower cap comprises an axial hub that downwardly axially extends from inner side of the radial body.

The bearing is a rolling bearing, the first and second rings defining an annular rolling chamber between them and at least one row of rolling elements being disposed within the rolling chamber.

The rolling elements are balls.

The outwardly radially-extending flange comprises at least one axial through hole, the damping element having a portion passing through the hole.

The damping element is directly molded on the lower annular bearing member.

The damping element comprises at least one deflecting flange that outwardly and substantially radially extends for reducing any ingress of water and other pollutants between the upper and lower annular bearing members.

The damping element comprises rubber thermoplastic elastomer (TPE), in particular thermoplastic polyurethane (TPU), melt processible elastomer (MPE) or elastomer cellular foam.

The invention also relates to a motor vehicle suspension strut comprising a damper rod, a suspension spring, and a suspension thrust bearing device as mentioned above.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
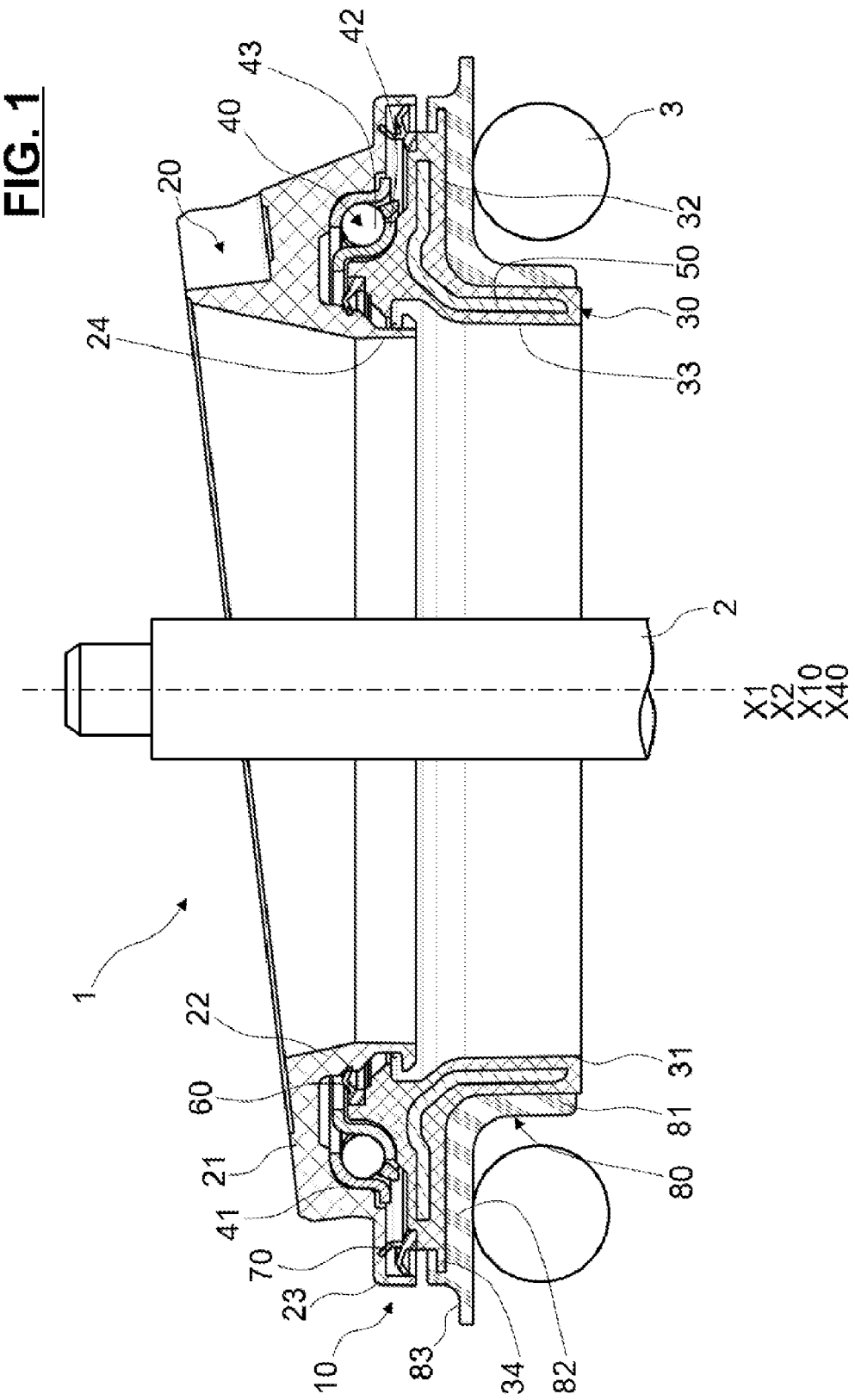
FIG. 1 is a sectional view of a suspension strut according to a first embodiment of the invention, comprising a suspension thrust bearing unit also according to a first embodiment of the invention, and a damper rod and a suspension spring.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 consists in a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage (not referenced) for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The inner race 41 is fitted within a toroidal inner portion of the lower cap 30. The inner race 41 and the lower cap 30 form a lower annular bearing member. The outer race 42 is fitted onto a toroidal outer portion provided on the lower side of flange 21 of the upper cap 20. The outer race 42 and the upper cap 20 form an upper annular bearing member. The upper and lower annular bearing members are in relative rotation with respect to the axis X40.

The lower cap 30 comprises an axially-extending hub 31 defining an inner bore 33 wherein the rod 2 axially extends. The lower cap 30 further comprises a radial body 32 that radially outwardly extends from the hub 31. The toroidal outer portion supporting the inner race 41 of the rolling bearing 40 is provided on an upper surface of the radial body 32.

The lower cap 30 comprises a stiffening insert 50 extending along the hub 31 and the flange 32 so as to support the load and the shocks exerted by the spring 3.

As illustrated in FIG. 1, the lower cap 30 is further provided with a stiffening insert 50. The stiffening insert 50 may be in metal or in a rigid plastic. The stiffening insert 50 comprises an axially-extending hub embedded within the hub 31 of lower cap 30. The stiffening insert 50 further comprises an outwardly radially-extending flange embedded within the radial body 32 of lower cap 30. Advantageously, the lower cap 30 is overmolded onto the stiffening insert 50. Alternatively, the lower cap 30 does not comprise a stiffening insert. As an alternate embodiment not illustrated, the upper cap 20 further comprises a stiffening insert.

Inner sealing means 60 are provided between an inner periphery of the radial body 32 of the lower cap 30 and the inner hub 22 of the upper cap 20. Outer sealing means 70 are provided between an outer periphery of the radial body 32 of the lower cap 30 and the outer skirt 23 of the upper cap 20.

The lower cap 30 is further provided with a damping element 80 made from a resilient material so as to enable vibrations to be filtered.

The tubular axial portion 81 axially extends from the radial portion 82 towards the lower side of the suspension thrust bearing device 10. The tubular axial portion 81 is tightly fastened to an outer cylindrical surface of the hub 31 of the lower cap 30. The tubular axial portion 81 of the damping element 80 supports radial load and shocks from the suspension spring 2.

The damping element 80 comprises a tubular axial portion 81 and a radial portion 82. The radial portion 82 is tightly fastened to the lower side of the radial body 32 of the lower cap 30. The radial portion 82 comprises a lower radial side for receiving an end turn of the suspension spring 3 in bearing contact. The radial portion 82 of the damping element 80 supports axial load and shocks from the suspension spring 3.

The tubular axial portion 81 and radial portion 82 of the damping element 80 are connected together so as to cover the exterior surface of the axial hub 31 and the radial body 32 of the lower cap 30.

The damping element 80 further comprises a deflecting flange 83 to prevent any ingress of water and pollutant inside the device 10, and more particularly the bearing 40. The deflecting flange 83 extends the radial portion 82 radially outwards, starting from a large diameter edge. The deflecting flange 83 extends radially outwards beyond the large diameter edge of radial body 32 of lower cap 30. Advantageously, the deflecting flange 83 extends radially outwards at least at the same diameter as the outer skirt 23 of outer cap 20.

The damping element 80 is made from a resilient material, such as rubber thermoplastic elastomer (TPE), in particular thermoplastic polyurethane (TPU), melt processable elastomer (MPE) or elastomer cellular foam.

The damping element 80 is advantageously overmolded onto the lower cap 30.

According to the invention, the radial body 32 of lower cap 30 comprises an outwardly radially-extending cap flange 34. More precisely, the cap flange 34 is a radial extension of radial body 32 towards the exterior of the device 10. In the embodiment of FIG. 1, the cap flange 34 is of reduced axial thickness with respect to the radial body 32. In the embodiment illustrated in FIGS. 1 to 3, the cap flange 34 is annular. Alternatively, the flange may extend less than 360°. According to another embodiment not illustrated, the radial body 32 may comprises a plurality of circumferentially spaced flanges.

The radial cap flange 34 is embedded within the damping element 80. More precisely, the cap flange 34 of lower cap 30 is axially covered on upper and lower sides by the material of radial portion 82 of damping device 80. The free end of the cap flange 34 is also covered by the material of radial portion 82 of damping device 80.

Thanks to the invention, the radial portion 82 of damping element 80 is axially maintained by the cap flange 34 to the lower cap 30. The cap flange 34 forms mechanical retention means and prevents any separation of radial portion 82 of damping means from body 32 of lower cap 30.

Another advantage of the invention is that the cap flange 34 of lower cap 30 forms stiffening means for the outer end of radial portion 82. The deflector 34 is then more rigid.

Figure 2:
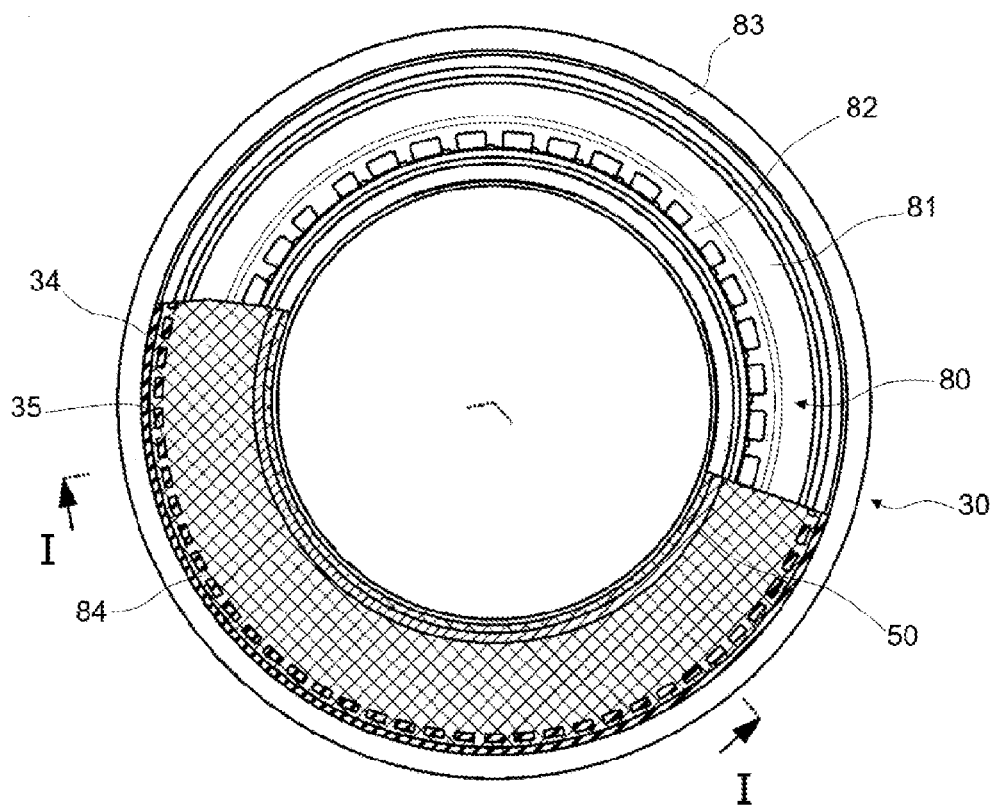
FIG. 2 is a half-cut bottom view of the suspension thrust bearing unit of FIG. 1.
Figure 3:
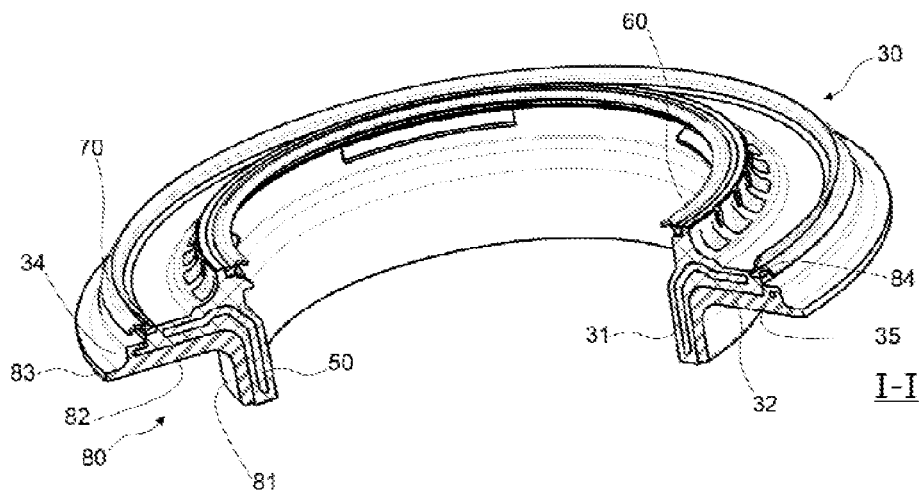
FIG. 3 is a half-cut perspective view along line I-I of the suspension thrust bearing unit of FIG. 2.

According to an advantageous embodiment of the invention illustrated in FIGS. 2 and 3, the cap flange 34 of lower cap 30 comprises a plurality of axial through holes 35. Through holes 35 are provided axially through the thickness of cap flange 34, and are circumferentially equally distributed. Alternatively, the holes may be unevenly distributed. Alternatively, the cap flange 34 may comprises only one through hole.

The damping element 80 has a portion 84 extending through the holes 35 and then connect upper and lower portions of radial portion 82 wherein cap flange 34 is embedded. Thanks to this embodiment, the retention of damping element 80 with lower cap 30 is improved.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A suspension thrust bearing device for use with a suspension spring in an automotive suspension strut of a vehicle, comprising:
   a bearing having an upper annular bearing member and a lower annular bearing member in relative rotation, the lower annular bearing member comprising an outer radial end formed by a radial body, the radial body extending radially outwardly past the bearing and forming an axially extending radial surface, and
   a damping element made of resilient material and disposed between the lower annular bearing member and the suspension spring,
   wherein an outwardly radially-extending flange is positioned on the axially extending radial surface of the radial body, the outwardly radially-extending flange being embedded within the damping element and having a smaller axial width than the radial body.

2. The device according to the claim 1, wherein the bearing of the suspension thrust bearing device comprises a first ring fixed to an upper cap, so as to form the upper annular bearing member of the suspension thrust bearing device, and a second ring fixed to a lower cap, so as to form the lower annular bearing member of the suspension thrust bearing.

3. The device according to the claim 2, wherein the lower cap comprises an axial hub that downwardly axially extends from an inner side of the radial body.

4. The device according to claim 2, wherein the bearing is a rolling bearing, the first and second rings defining an annular rolling chamber between them and at least one row of rolling elements being disposed within the rolling chamber.

5. The device according to the claim 4, wherein the rolling elements are balls.

6. The device according to claim 1, wherein the outwardly radially-extending flange comprises at least one axial through hole, the damping element having a portion passing through the hole.

7. The device according to claim 1, wherein the damping element is directly molded on the lower annular bearing member.

8. The device according to claim 1, wherein the damping element comprises at least one deflecting flange that outwardly and substantially radially extends for reducing any ingress of water and other pollutants between the upper and lower annular bearing members.

9. The device of claim 1, wherein the lower annular bearing member further comprises a stiffening insert.

10. A motor vehicle suspension strut comprising:
    a damper rod,
    a suspension spring, and
    a suspension thrust bearing device for use with the suspension spring in an automotive suspension strut of a vehicle, providing:
    a bearing having an upper annular bearing member and a lower annular bearing member in relative rotation, the lower annular bearing member comprising an outer radial end formed by a radial body, the radial body extending radially outwardly past the bearing and forming an axially extending radial surface, and
    a damping element made of resilient material and disposed between the lower annular bearing member and the suspension spring, wherein an outwardly radially-extending flange is positioned on the axially extending radial surface of the radial body, the outwardly radially-extending flange being embedded within the damping element and having a smaller axial width than the radial body.

11. The device according to claim 10, wherein the outwardly radially-extending flange comprises at least one axial through hole, the damping element having a portion passing through the hole.

12. The device according to claim 10, wherein the damping element comprises at least one deflecting flange that outwardly and substantially radially extends for reducing any ingress of water and other pollutants between the upper and lower annular bearing members.

13. The device of claim 10, wherein the lower annular bearing member further comprises a stiffening insert.

14. A suspension thrust bearing device for use with a suspension spring in an automotive suspension strut of a vehicle, comprising:
   a bearing having an upper annular bearing member and a lower annular bearing member in relative rotation, the lower annular bearing member comprising a stiffening insert, the stiffening insert comprising an axial portion and a radial portion,
   a damping element made of resilient material and disposed between the lower annular bearing member and the suspension spring,
   wherein the lower annular bearing member comprises an outwardly radially extending flange, the outwardly radially extending flange being embedded within the damping element, and
   wherein the outwardly radially extending flange is axially spaced from and does not overlap the radial portion of the stiffening insert.

15. The device according to claim 14, wherein the outwardly radially-extending flange comprises at least one axial through hole, the damping element having a portion passing through the hole.

16. The device according to claim 14, wherein the damping element comprises at least one deflecting flange that outwardly and substantially radially extends for reducing any ingress of water and other pollutants between the upper and lower annular bearing members.

17. A suspension thrust bearing device for use with a suspension spring in an automotive suspension strut of a vehicle, comprising:
   a bearing having an upper annular bearing member and a lower annular bearing member in relative rotation,
   a stiffening insert embedded in the lower annular bearing member and completely covered thereby,
   a damping element made of resilient material and disposed between the lower annular bearing member and the suspension spring,
   wherein the lower annular bearing member comprises an outwardly radially extending flange which is formed by the lower annular bearing member, the outwardly radially extending flange being embedded within the damping element such that the damping element surrounds a radial most end of the lower annular bearing member and overlies a radially extending axial surface of the outwardly radially extending flange which faces the upper annular bearing.

18. The device according to claim 17, wherein the outwardly radially-extending flange comprises at least one axial through hole, the damping element having a portion passing through the hole.

19. The device according to claim 17, wherein the damping element comprises at least one deflecting flange that outwardly and substantially radially extends for reducing any ingress of water and other pollutants between the upper and lower annular bearing members.

* * * * *